United States Patent
Cochenour et al.

(10) Patent No.: US 10,871,445 B2
(45) Date of Patent: Dec. 22, 2020

(54) OPTICAL VORTEX TRANSMISSOMETER

(71) Applicant: United States of America, as represented by the Secretary of the Navy, Patuxent River, MD (US)

(72) Inventors: Brandon Cochenour, Alexandria, VA (US); Amanda Alley, Great Mills, MD (US); Alan Edward Laux, Great Mills, MD (US); Linda Mullen, Chesapeake Beach, MD (US)

(73) Assignee: The United States of America as represented by the Secretary of the Navy, Patuxent River, MD (US)

( * ) Notice: Subject to any disclaimer, the term of this patent is extended or adjusted under 35 U.S.C. 154(b) by 66 days.

(21) Appl. No.: 16/267,438

(22) Filed: Feb. 5, 2019

(65) Prior Publication Data
US 2020/0249159 A1    Aug. 6, 2020

(51) Int. Cl.
*G01N 21/53*        (2006.01)
*G01N 21/59*        (2006.01)

(52) U.S. Cl.
CPC ....... *G01N 21/538* (2013.01); *G01N 21/5907* (2013.01); *G01N 2021/5988* (2013.01)

(58) Field of Classification Search
CPC ............. G01N 21/538; G01N 21/5907; G01N 2021/5988; G01S 17/10; G01S 7/4808; G01S 7/484; G01S 7/4861; G01S 7/4865; G01S 7/4816; G01S 7/4876; G01S 17/58; G01S 17/95; G01S 7/4802; G01S 7/4814; G02B 27/50; G02B 5/1871; B64D 2045/007; B64D 45/00; B64D 43/00; B64D 47/04; G01P 5/26; G01W 1/10; G01W 2001/003; Y02A 90/19

USPC .................................................. 356/432–448
See application file for complete search history.

(56) References Cited

U.S. PATENT DOCUMENTS

2016/0202283 A1* 7/2016 Wang .................... B64D 45/00
                                                                356/28
2019/0285731 A1* 9/2019 Cochenour ............. G01S 17/10

OTHER PUBLICATIONS

Alley, et al, An Optical Vortex Transmissometer, SPIE DCS, Orlando FL, Apr. 17, 2018.

\* cited by examiner

*Primary Examiner* — Tri T Ton
(74) *Attorney, Agent, or Firm* — Mark O. Glut; Olivia Scheuer; NAWCAD

(57) ABSTRACT

A method and system for optical vortex transmissometry. The method uses optical orbital angular momentum (OAM) and optical vortices to discriminate coherent non-scattered light from incoherent scattered light. The system includes a laser which transmits a Gaussian laser beam through a medium. An OAM generating device is placed before a photodetector receiver. Coherent, non-scattered light passing through the OAM generating device forms an optical vortex, used to discriminate against the unwanted scattered signal that doesn't form a vortex. Alternatively, the system includes a transmitter which generates one or more OAM modes which are transmitted through a turbid medium. At the receiver, an OAM detection device analyzes the OAM mode spectrum of the received light. Coherent non-scattered light retains the OAM encoded at the transmitter, while scattered light does not. The attenuation of the channel is determined by comparison of the received OAM mode spectrum relative to the transmitted OAM mode spectrum.

12 Claims, 5 Drawing Sheets

OPTICAL VORTEX TRANSMISSOMETER

STATEMENT OF GOVERNMENT INTEREST

The invention described herein may be manufactured and used by or for the Government of the United States of America for governmental purposes without payment of any royalties thereon or therefor.

BACKGROUND

Transmissometry is a method of measuring the inherent optical properties of a medium, such as absorption, scattering, or total attenuation. Transmissometry of the atmosphere or ocean provides insight into its composition or the physical, chemical, or biological processes within. The transmission of light in a medium can serve as a measure of visibility, and the accurate measurement of the inherent optical properties is critical for predicting the performance of optical sensors for remote sensing, lidar, imaging, and free space communications systems.

A transmissometer is an instrument designed to measure and quantify the optical attenuation of the medium due to absorption and scattering of light. Generally, a transmissometer operates by sending a narrow, collimated beam of energy (e.g., a laser) through the medium. A photo-receiver placed a set distance from the energy source intercepts the energy that is neither scattered nor absorbed, which can be used to compute the optical attenuation of the medium.

Light traveling through an opaque medium will experience absorption and scattering from the medium as well as any particulates contained therein. In highly scattering environments, it becomes increasingly difficult to discriminate the desired non-scattered, or ballistic, light from the undesired scattered component. The inclusion of scattered light has the negative effect of biasing the transmission measurement. One technique to reject scattered light, popular in current commercial instruments, is to transmit a collimated laser source and restrict the receiver aperture and field of view to spatially reject the scattered light. However, achieving a sufficiently narrow field of view can be challenging, especially when light scatters close to the beam axis. This is often the case in the ocean where the particle sizes are large compared to the illumination wavelength.

SUMMARY

In general, a method and system for performing transmissometry to measure the total optical attenuation in an opaque medium.

In one embodiment, a system comprising: a laser transmitter, configured to transmit a Gaussian beam (OAM order m=0) through a scattering and absorbing medium; an optical receiver, positioned opposite the transmitter at some distance within the medium, containing a device to generate an optical vortex, wherein one or more signals pass through the devices and onto a photodetector.

In another embodiment, a system comprising: a laser transmitter, configured to encode one or more OAM states (|m|>0) onto an optical beam, directed through a scattering and absorbing medium; and an optical receiver, positioned opposite the transmitter at some distance within the medium, configured to detect the transmitted OAM states.

Unless otherwise defined, all technical and scientific terms used herein have the same meaning as commonly understood by one of ordinary skill in the art to which this invention belongs. Other features and advantages will be apparent from the following detailed description.

DRAWINGS

These and other features, aspects and advantages of the present invention will become better understood with reference to the following description and appended claims, and accompanying drawings wherein:

DETAILED DESCRIPTION

Embodiments of the present invention describe a method of transmissometry that effectively discriminates non-scattered and scattered light. Discrimination is achieved by exploiting spatial coherence and optical orbital angular momentum (OAM). OAM is a property of light that describes the helicity of the phase front of an optical beam. This helical nature creates a phase discontinuity along the axis of the beam resulting in an intensity null, often referred to as an optical vortex. The OAM mode order, or 'charge' number, m, describes the number of $2\pi$ azimuthal rotations of the phase front upon travelling a distance of one wavelength. An OAM charge of m=0 describes a typical Gaussian beam. The optical vortex can be used to improve the rejection of scattered light compared to traditional techniques, Embodiments of the present invention provide a robust method for discrimination against forward scattered light in opaque media. Improved discrimination is obtained through the use of optical vortices and the orbital angular momentum (OAM) of light, and exploits differences in optical coherence between the desired ballistic (coherent) and undesired scattered (incoherent) light.

Embodiments of the present invention provide for a method and apparatus of transmissometry using an optical vortex and OAM. Embodiments of the present invention overcome existing transmissometer errors, including the inability to reject small angle forward scattered light; which, leads to the underestimation of the measured beam attenuation coefficient. Use of the optical vortex and OAM can be exploited to discriminate against unwanted scatter components, regardless of the receiver's field of view.

In the following detailed description, reference is to the accompanying drawings, which show, by way of illustration, specific embodiments in which the invention, as claimed, may be practiced. The invention may, however, be embodied in many different forms and should not be construed as limited to the embodiments set forth; rather, these embodiments are provided so that this disclosure will be thorough and complete, and will fully convey the scope of the invention to those skilled in the art.

Figure 1:
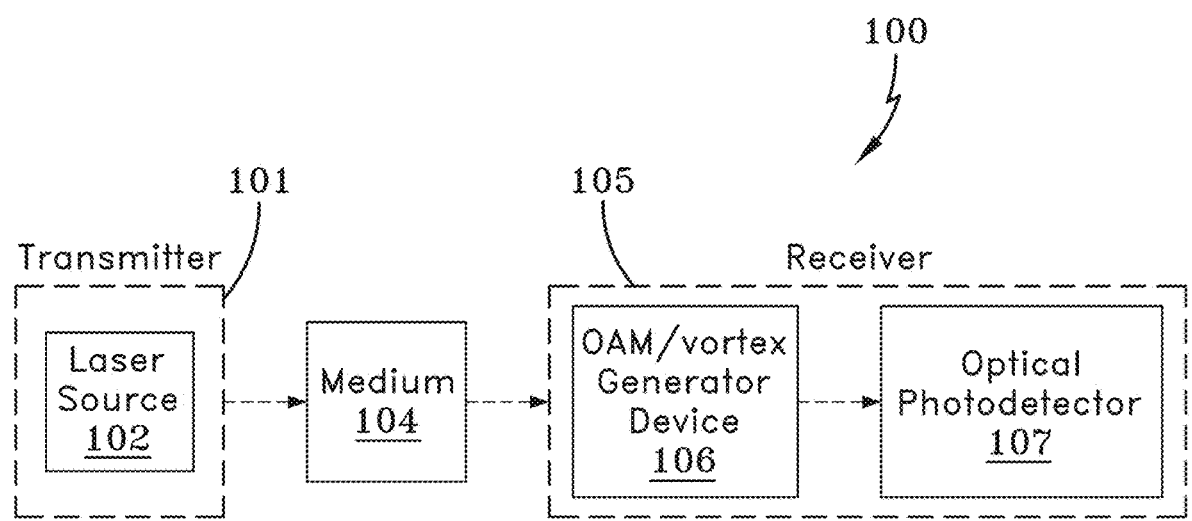
FIG. 1 is a block diagram depicting one embodiment of the optical vortex transmissometer device, wherein a Gaussian beam is generated at the transmitter, transmitted through a medium, and an optical vortex is formed at the receiver.

Turning now to the figures, FIG. 1 is a block diagram depicting one embodiment of the optical vortex transmissometer. Optical vortex transmissometer 100 includes transmitter 101 and receiver 105 components.

In transmitter 101, laser 102 emits a Gaussian beam. Laser 102 is directed toward turbid medium 104. As the laser beam passes through turbid medium 104, the non-scattered ballistic light will retain its spatial coherence, whereas the scattered component will become incoherent.

At receiver 105, the received ballistic and scattered light passes through OAM/optical vortex generating device 106. In some embodiments, OAM/vortex generating device 106 is a diffractive spiral phase plate. In other embodiments, OAM/vortex generating device 106 may include computer-generated diffractive patterns or holograms using a spatial light modulator.

The spatially coherent ballistic light, passing through OAM/vortex generating device 106, forms an optical vortex on optical photodetector 107. The OAM/vortex generating device 106 may generate any order |m|>0. In some embodiments, larger orders of OAM resulting in a larger vortex may be used. In one embodiment, optical photodetector 107 is a CCD camera. Spatially incoherent scattered light, passing through OAM/vortex generating device 106, is unaffected as its optical phase is disturbed by the scattering medium. Thus, it does not form an optical vortex and its intensity will be distributed on the optical photodetector 107 according to its angle of arrival at the receiver.

Figure 3:
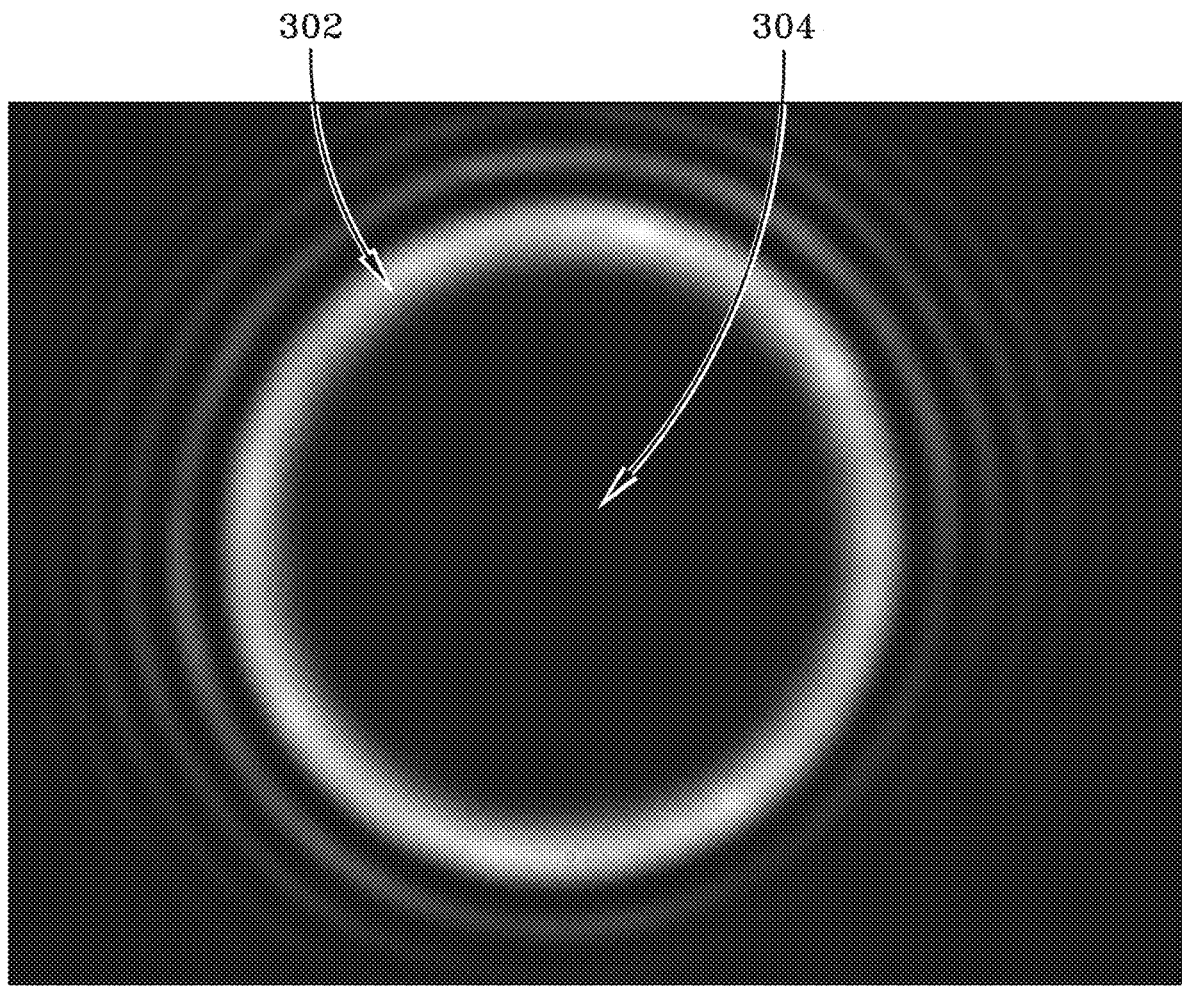
FIG. 3 is an example of an image formed at the photodetector using the embodiment illustrated in FIG. 1.

FIG. 3 is an example of an image produced by the optical photodetector 107 in optical vortex transmissometer 100. The intensity of light on optical photodetector 107 can be analyzed as two regions. The two regions are vortex 302 and core 304. All of the coherent non-scattered light is concentrated in the vortex 302. Whereas, spatially incoherent scattered light is distributed across the entire image. Therefore, the measured intensity of the vortex 302 is the sum of the coherent ballistic light and the incoherent scattered light. The intensity of core 304 is due to scattered light only. In post-processing, by subtracting the intensity of core 304, which contains only scattered light, from the intensity of vortex 302, which contains both scattered light and non-scattered light, the intensity of the desired non-scattered component is calculated, This measurement can then be used to determine the total attenuation, or transmittance, of the medium.

Figure 2:
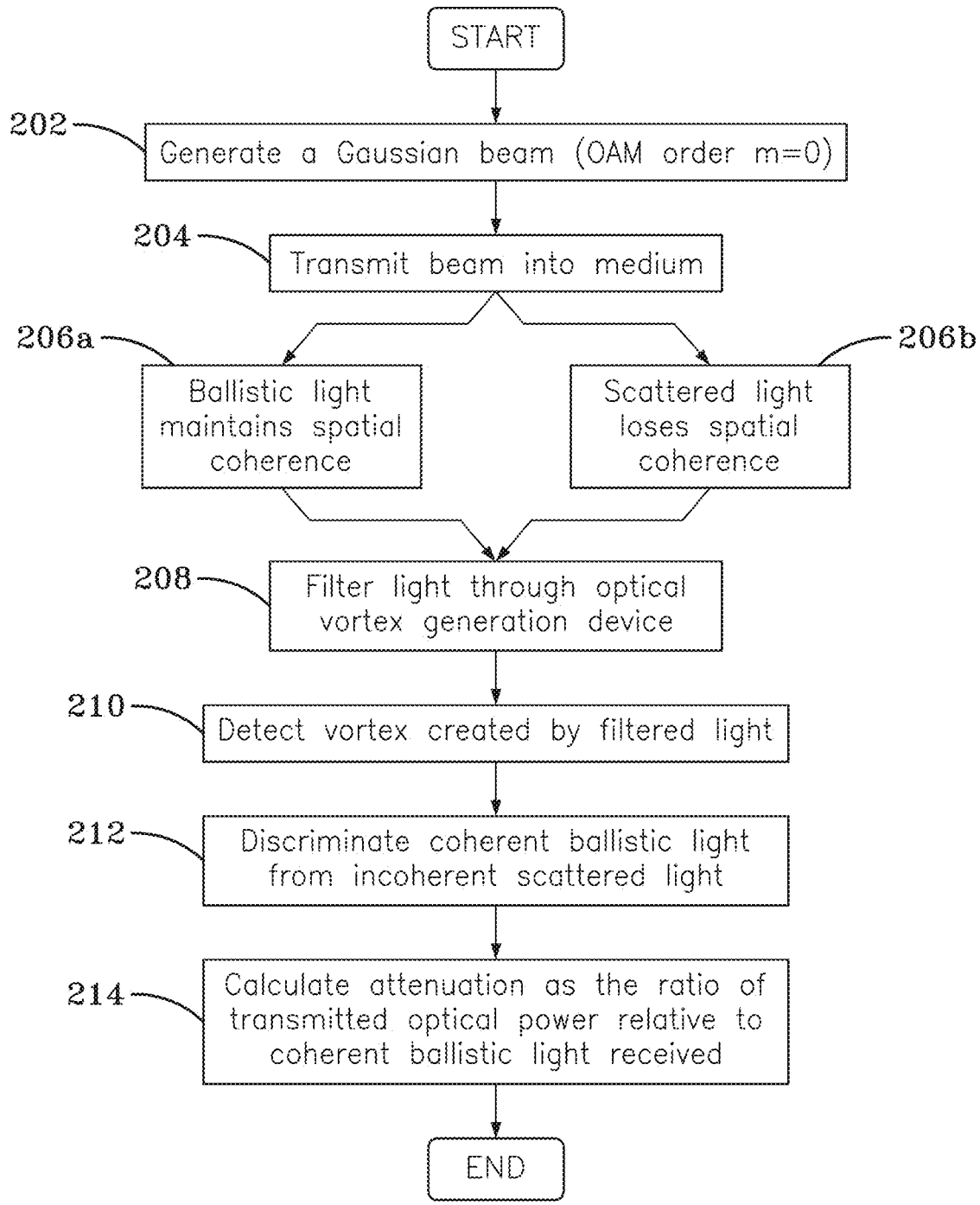
FIG. 2 is a block diagram of the process for transmissometer measurements using the embodiment in FIG. 1.

FIG. 2 is a block diagram of the process for determining the combined effects of absorption and scattering (or total attenuation) of the medium using optical vortex transmissometer 100. One skilled in the art will recognize that functions described in the block diagram may occur out of order noted in the figure. For example, two blocks shown in succession may, in fact, be executed substantially concurrently, depending upon the functionality involved. The process depicted in FIG. 2 uses a OAM/vortex generating device to create an optical vortex, which allows for the differentiation of the spatially coherent and incoherent components of the received optical signal In step 202, a Gaussian laser beam (m=0) is generated. In step 204, the beam is transmitted toward a medium. In some embodiments, the beam may be either continuous, pulsed, or modulated. In steps 206a and 206b, non-scattered ballistic light maintains spatial coherence, while scattered light becomes incoherent. Scattered light received by the optical receiver is noise that minimizes the accuracy of determining the total attenuation properties of the medium, In step 208, the light signals—both ballistic and scattered—are filtered through an optical vortex generating device (|m|>0). Coherent (i.e., ballistic) light signals that are filtered through the helical phase element form an optical vortex, whereas incoherent (i.e., scattered) light does not, and is evenly dispersed onto the core and vortex regions. In step 210, the signals are detected by a photodetector, The combined image recorded by the receiver, in the form of the core and vortex, can be used to determine the desired ballistic component. In post processing, the measured intensity of the incoherent light in the core can be subtracted from the measured intensity in the region of the vortex to calculate the received non-scattered intensity. Thus, the total optical attenuation in the medium can be determined.

Figure 4:
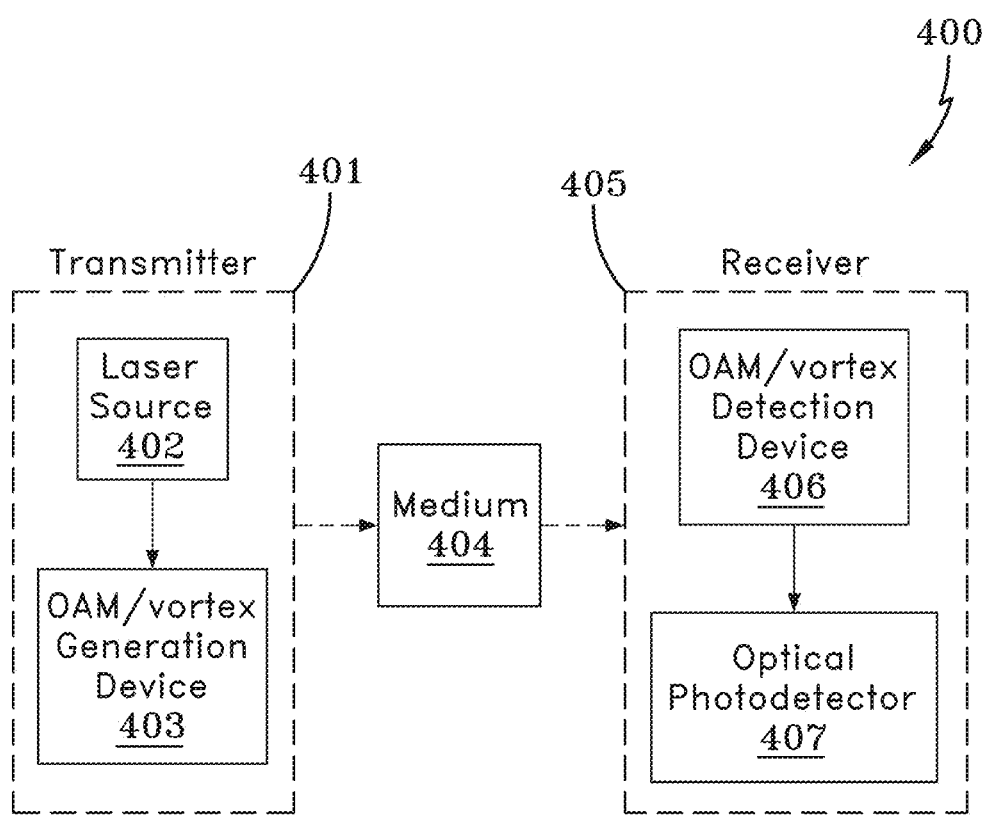
FIG. 4 is a block diagram depicting another embodiment of the optical vortex transmissometer device, wherein one or several OAM states are generated at the transmitter, transmitted through the medium, and detected at the receiver.

FIG. 4 illustrates a different embodiment. Optical vortex transmissometer 400 includes transmitter 401 and receiver 405 components.

In transmitter 401, laser source 402 emits a Gaussian beam. OAM/vortex generation device 403 imparts one or more OAM modes onto the optical beam (|m|>0), The resultant vortex beam is transmitted through medium 404, where it undergoes scattering and absorption. Ballistic non-scattered light maintains the helical phase prescribed by its particular OAM charge. Scattering results in a loss of the transmitted helical phase.

At receiver 405, OAM/vortex detection device 406 is used to analyze the transmitted OAM mode or modes, whose intensity is then detected by an optical photodetector 407. The amplitude of the OAM mode or modes detected at receiver 405 corresponding to those transmitted represents the unperturbed non-scattered component. Any mode or modes received that do not correspond to a transmitted mode or modes represents unwanted scattered clutter. Thus, the desired non-scattered component can be effectively discriminated from the undesired scattered component, leading to a more accurate measurement of total optical attenuation.

Figure 5:
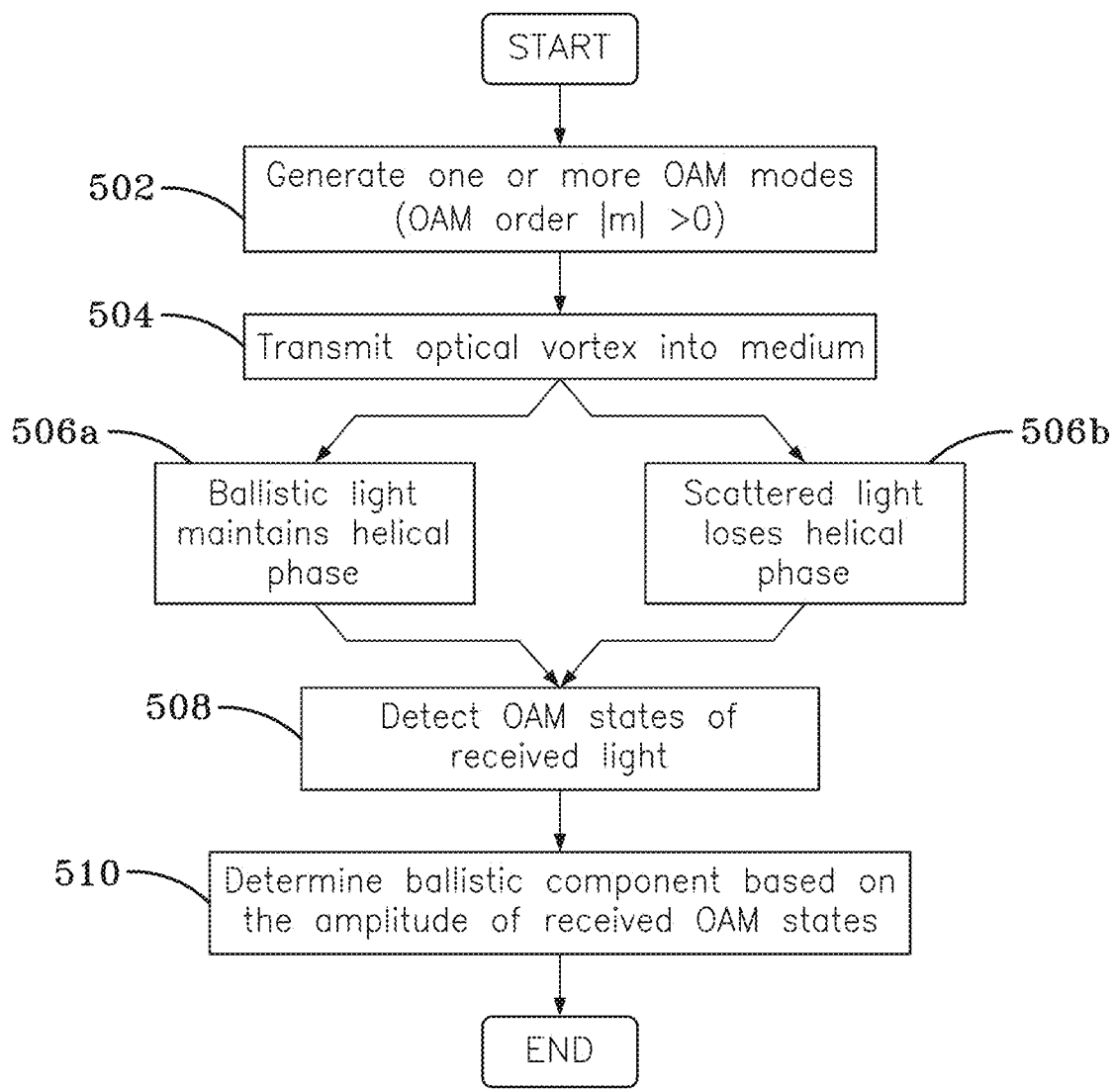
FIG. 5 is a block diagram of the process for transmissometer measurements using the embodiment in FIG. 4.

FIG. 5 is a block diagram of the process for determining total attenuation of the medium using optical vortex transmissometer 400. One skilled in the art will recognize that functions described in the block diagram may occur out of order noted in the figure. For example, two blocks shown in succession may, in fact, be executed substantially concurrently, depending upon the functionality involved.

In step 502, an OAM state or states (|m|>0) are applied to a Gaussian laser beams (m=0) to create an optical vortex. In step 504, the optical vortex is transmitted into the optical medium. In step 506, non-scattered ballistic light maintains the helical phase 506a structure, and the vortex is maintained, while scattered light will lose its initial helical phase 506b structure. In step 508, an OAM detection device analyzes the amplitudes of the received OAM modes. In step 510, the received OAM mode amplitudes are compared to the transmitted OAM mode amplitudes, thus providing a method of accurately measuring total attenuation.

The above description is that of current embodiments of the invention. Various alterations and changes can be made without departing from the spirit and broader aspects of the invention as defined in the appended claims.

What is claimed is:

1. A system for transmissometry, the system comprising:
  a laser transmitter, configured to transmit a Gaussian beam toward a scattering and absorbing opaque medium, wherein the Gaussian beam comprises a plurality of light signals;
  an optical receiver, positioned opposite the transmitter at a set distance within the opaque medium, comprising a device to generate orbital angular momentum (OAM)

and an optical vortex, wherein one or more of the plurality of light signals pass through the OAM/optical vortex device; and a photodetector that detects the one or more light signals exiting the OAM/optical vortex device.

2. The system of claim 1, wherein the one or more light signals passing through the OAM/optical vortex device includes at least one coherent, non-scattered signal and at least one incoherent, scattered signal.

3. The system of claim 1, wherein the OAM/optical vortex generating device is a spiral phase plate.

4. The system of claim 1, wherein the OAM/optical vortex generating device imparts orbital angular momentum on the at least one coherent non-scattered signal, forming an optical vortex.

5. The system of claim 2, wherein the OAM/optical vortex generating device spatially separates the one or more light signals into a core region and a vortex region.

6. The system of claim 5, wherein the core region is a measurement of the incoherent, scattered signal, and wherein the vortex region is a measurement of the coherent, non-scattered signal and incoherent, scattered signal.

7. The system of claim 6, wherein the coherent, non-scattered signal can be measured by subtracting the measurement of the core region from the measurement of the vortex region.

8. A method for transmissometry, the method comprising:
transmitting a Gaussian beam toward a scattering and absorbing opaque medium, wherein the Gaussian beam comprises a plurality of light signals;

receiving, one or more light signals of the plurality of light signals, wherein the one or more light signals are analyzed by an OAM/optical vortex generating device; and detecting, by a photodetector, the analyzed light signals.

9. The method of claim 8, wherein the one or more light signals includes at least one coherent, non-scattered signal and at least one incoherent, scattered signal.

10. The method of claim 9, wherein analyzing comprises:
spatially separating, by the OAM/optical vortex generating device, the one or more light signals into a core region and a vortex region.

11. The method of claim 10, wherein the core region is a measurement of the incoherent, scattered signal, and wherein the vortex region is a measurement of the coherent, non-scattered signal and incoherent, scattered signal.

12. The method form claim 11, wherein the coherent, non-scattered signal can be measured by subtracting the measurement of the core region from the measurement of the vortex region.

* * * * *